(12) United States Patent
Ohkubo et al.

(10) Patent No.: US 6,659,251 B2
(45) Date of Patent: Dec. 9, 2003

(54) MULTIPLE PLATE CLUTCH DEVICE

(75) Inventors: Masahiro Ohkubo, Kyoto (JP); Koji Yoneyama, Osaka (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/075,595

(22) Filed: Feb. 15, 2002

(65) Prior Publication Data

US 2002/0115520 A1 Aug. 22, 2002

(30) Foreign Application Priority Data

Feb. 22, 2001 (JP) ........................ 2001-045951

(51) Int. Cl.[7] ............... F16D 25/0638; F16D 13/52
(52) U.S. Cl. .................. 192/85 AA; 192/70.28
(58) Field of Search ............. 192/70.28, 85 AA; 188/71.5, 72.3, 72.4

(56) References Cited

U.S. PATENT DOCUMENTS

| 2,935,169 | A | * | 5/1960 | Mills | ............... | 192/85 AA |
| 4,426,891 | A | * | 1/1984 | Kubo et al. | ............... | 475/146 |
| 4,548,306 | A | * | 10/1985 | Hartz | ............... | 192/70.28 |
| 5,967,929 | A | * | 10/1999 | Matsuoka et al. | ............... | 475/159 |

FOREIGN PATENT DOCUMENTS

| JP | 55107130 A | * | 8/1980 | ............ F16D/55/36 |
| JP | 5-71554 A | | 3/1993 | |
| JP | 9-32918 A | | 2/1997 | |

* cited by examiner

*Primary Examiner*—Richard M. Lorence
(74) *Attorney, Agent, or Firm*—Shinjyu Global IP Counselors, LLC (57) ABSTRACT

A multiple plate clutch device is provided to conserve space. In a reverse hydraulic brake device 7, a plurality of teeth 35 is formed next to one another in a circumferential direction in an inner peripheral surface portion 31 of a transmission case 21. A plurality of first brake plates 24 includes engagement teeth 41, 42. The engagement teeth 41, 42 engage the plurality of teeth 35 on the inner peripheral surface portion 31 such that the plurality of first brake plates 24 is axially movable and non-rotatable relative to the inner peripheral surface 31. A plurality of second brake plates 25 is disposed to alternate axially with the plurality of first brake plates 24. A piston 22 pushes the plates 24 and 25. Return springs 28 are disposed within deep grooves 37 that are between the teeth 35 and the inner peripheral surface portion 31. The return springs 28 urge the first plate 29 that is closest the piston 22 towards the piston 22.

20 Claims, 8 Drawing Sheets

MULTIPLE PLATE CLUTCH DEVICE

BACKGROUND OF THE INVENTION

1. Field of the Invention

The present invention relates to a multiple plate clutch device. More specifically, the present invention relates to a multiple plate clutch device having a return spring for returning a piston.

2. Background Information

Generally speaking, conventional multiple plate clutch devices are equipped with a plurality of first and second plates arranged alternately in an axial direction and a piston that is driven by hydraulic pressure. Conventional multiple plate clutch devices press the first and second plates together. Multiple plate clutch devices are used in automatic transmissions and also function as a brake. The multiple plate clutch device is also provided with a return spring for returning the piston and releasing the clutch.

A plurality of coil springs, for example, is used as return springs. The coil springs are disposed in a circle with one end supported by a retaining plate and another end abutting the piston. The retaining plate receives a load from the piston by means of a snap ring fixed axially to a wall surface thereof. As a result, when hydraulic pressure does not act on the piston, the load applied by the return spring returns the piston and releases the engagement of the clutch.

Since the return spring arrangement just described is provided with a retaining plate and a snap ring, the number of parts increases and causes the multiple plate clutch device to be relatively expensive. Furthermore, the axial dimension of the device becomes large because a certain amount of space must be secured in the axial direction in order to arrange the return spring, etc.

In view of the above, there exists a need for a multiple plate clutch device that overcomes the above-mentioned problems in the prior art. This invention addresses this need in the prior art as well as other needs, which will become apparent to those skilled in the art from this disclosure.

SUMMARY OF THE INVENTION

An object of the present invention is to conserve space in a multiple plate clutch device.

A multiple plate clutch device in accordance with a first aspect of the present invention has a first member, a second member, a plurality of first plates, a plurality of second plates, a piston, and a return spring. The first member has a plurality of teeth aligned around a circumference thereof. The second member is disposed so as to face the first member in a radial direction. The plurality of first plates has engaging teeth that engage the plurality of teeth of the first member. The plurality of first plates is unable to rotate but able to move in an axial direction relative to the first member. The plurality of second plates is disposed alternately with respect to the plurality of first plates in the axial direction. The second plates non-rotatably engage the second member, and are able to move in the axial direction relative to the second member. The piston presses the first plates and the second plates together. The return spring is disposed inside a groove between the teeth of the first member and pushes the first plate that is closest to the piston toward the piston.

With this multiple plate clutch device, the clutch engages when the piston presses the first and second plates together. When the load on the piston is released, the return spring applies a force on the piston by way of the first plate that is closest to the piston and causes the piston to separate from the first and second plates. As a result, the multiple plate clutch device disengages. Since the return spring is disposed inside a groove between the teeth of the first member, the space conventionally occupied by the return spring can be omitted.

A multiple plate clutch device in accordance with a second aspect of the present invention is the device of the first aspect, wherein the return spring is a flat spring.

This multiple plate clutch device is able to conserve space by using a flat spring. The flat spring mentioned here is a spring made from a thin sheet material that provides a spring effect. More specifically, the flat spring is made of a thin sheet having a thickness of up to approximately 1 mm. The thin sheet is press worked into the desired shape and given a spring effect.

A multiple plate clutch device in accordance with a third aspect of the present invention is the device of the second aspect, wherein the return spring is disposed between an engaging tooth of the first plate that is closest to the piston and an engaging tooth of the first plate that is farthest from the piston.

This multiple plate clutch device does not require a special member to support the return spring because the first plates support the return spring.

A multiple plate clutch device in accordance with a fourth aspect of the present invention is the device of any of the aforementioned aspects, wherein one end of the return spring is held in an engaging tooth of the first plate that is closest to the piston.

In this multiple plate clutch device, the first plate that is closest to the piston determines the position of the return spring.

A multiple plate clutch device in accordance with a fifth aspect of the present invention is the device of the fourth aspect, wherein one end of the return spring is held in the engaging tooth of the first plate that is closest to the piston in such a manner that it cannot fall out.

With this multiple plate clutch device, the return spring and the first plate closest to the piston constitute a subassembly, making handling more convenient.

A multiple plate clutch device in accordance with a sixth aspect of the present invention is the device of the fifth aspect, wherein a slit is provided in the engaging tooth of the first plate that is closest to the piston. Further, the return spring has a claw that is held in the slit provided in the engaging tooth of the first plate that is closest to the piston.

A multiple plate clutch device in accordance with a seventh aspect of the present invention is the device of any of third through sixth aspects, wherein the return spring has a flat section that abuts against an axially facing surface of the engaging tooth of the first plate that is closest to the piston.

In this multiple plate clutch device, the orientation of the first plate that is closest to the piston is stable.

A multiple plate clutch device in accordance with an eighth aspect of the present invention is the device of any of third to seventh aspects, wherein the return spring has a curved part that contacts the engaging tooth of the first plate that is farthest from the piston.

In this multiple plate clutch device, the return spring can deflect smoothly in the axial direction when the clutch is engaged.

A multiple plate clutch device in accordance with a ninth aspect of the present invention is the device of eighth aspect, wherein the return spring has a projection whose movement in the radial direction is restricted by the engaging tooth of the first plate that is farthest from the piston.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
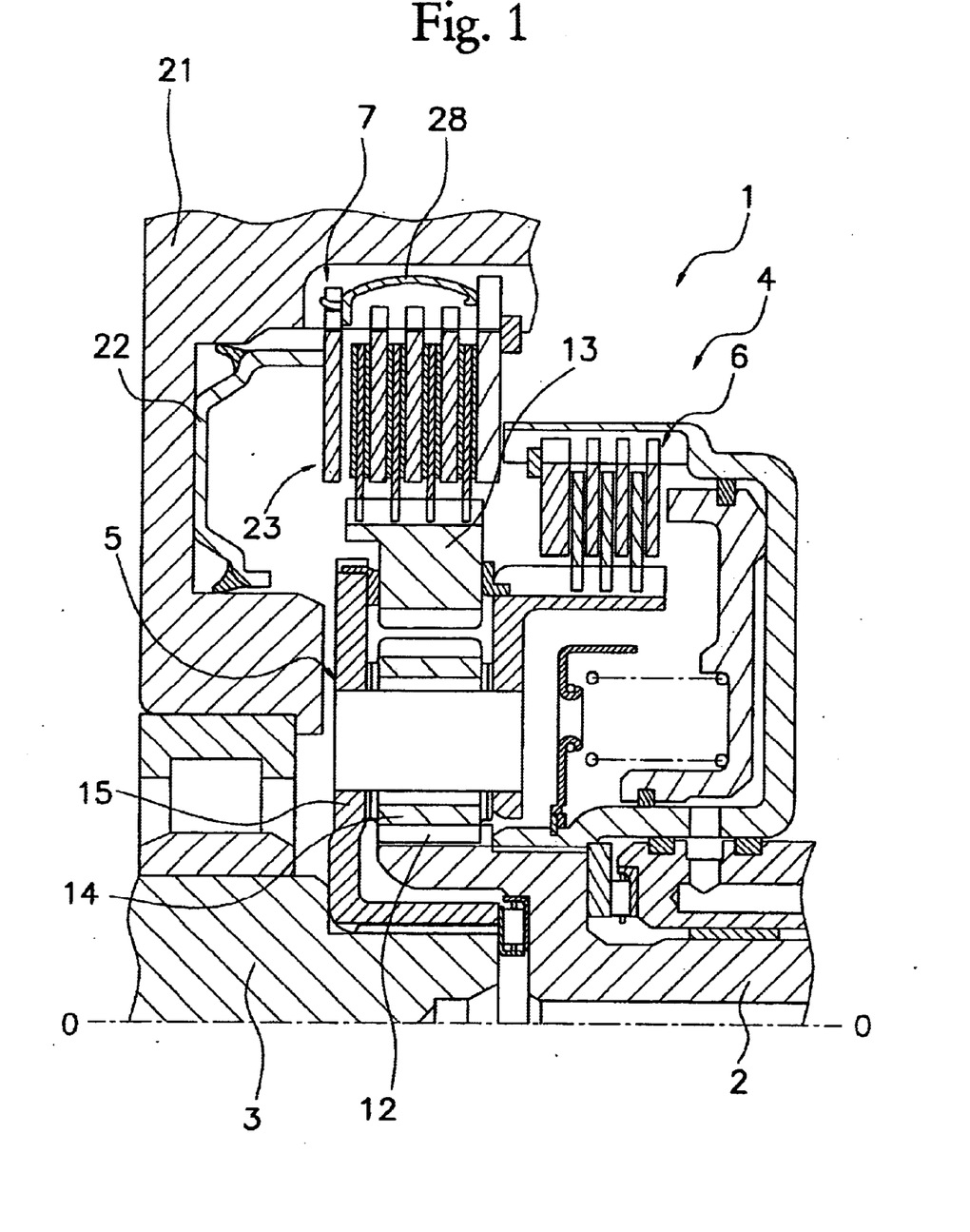
FIG. 1 is a cross-sectional schematic view illustrating a forward-reverse rotation device for a continuously variable transmission in accordance with a preferred embodiment of the present invention.

FIG. 1 shows a forward-reverse rotation device 1 for a continuously variable transmission in accordance with a preferred embodiment of the present invention. The forward-reverse rotation device 1 is disposed between a torque converter (not shown) to which power is delivered from an engine (not shown) to a belt-type continuously variable transmission (not shown). The forward-reverse rotation device 1 transmits torque from an input shaft 2 that extends from the torque converter to an output shaft 3 that extends from the continuously variable transmission. The forward-reverse rotation device 1 also reverses the direction of the rotational drive coming from the torque converter in order to allow the vehicle to move in reverse. Line O-O in FIG. 1 is the rotational axis of the forward-reverse rotation device 1.

The forward-reverse rotation device 1 is equipped with a forward-reverse switching device 4 and a planetary gearset 5 that switches a power transmission path by the forward-reverse switching device 4. The forward-reverse switching device 4 has a forward hydraulic clutch device 6 to which power is fed from the torque converter and a reverse hydraulic brake device 7 that controls the planetary gearset 5.

Figure 2:
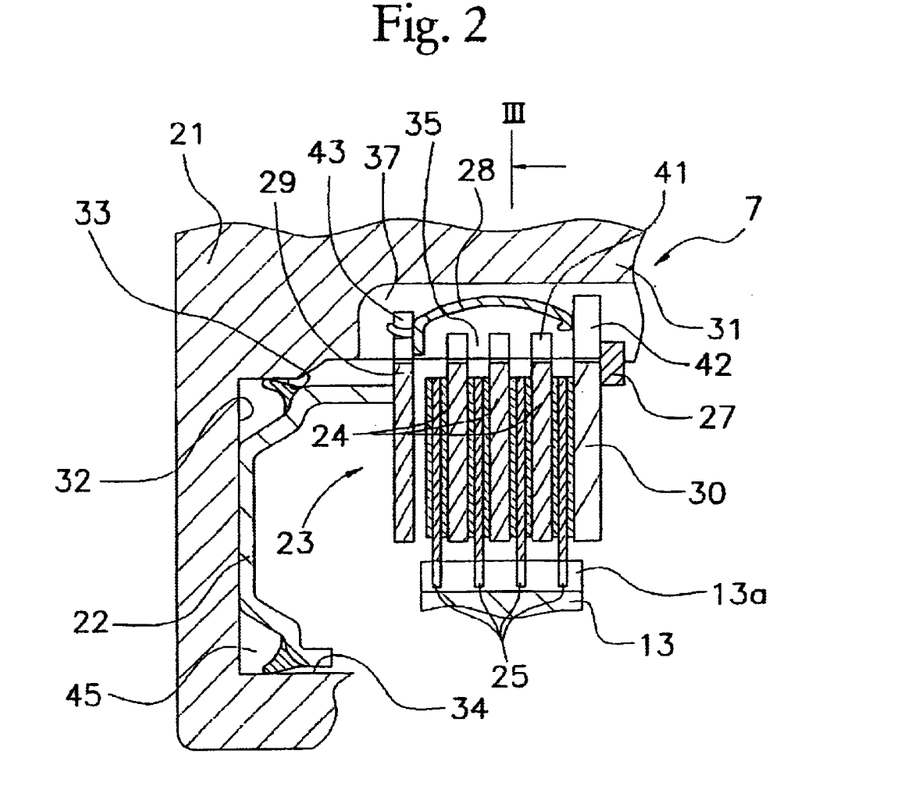
FIG. 2 is a cross-sectional schematic view of a brake device of the forward-reverse rotation device of FIG. 1.

The planetary gearset 5 is preferably a double pinion planet gear type gearset. The planetary gearset 5 is equipped with a sun gear 12, a ring gear 13, a plurality of planet gears 14, and a planet carrier 15. The ring gear 13 is concentric with the sun gear 12. The plurality of planet gears 14 meshes with the gears 12 and 13. There are preferably six planet gears 14. The planet carrier 15 supports the planet gears 14 such that they can rotate about an axis. The forward hydraulic clutch device 6 couples and releases the input shaft 2 to and from the planet carrier 15. The reverse hydraulic brake device 7 is a clutch device for securing and releasing the ring gear 13 to and from a transmission case 21. As shown in FIG. 2, the brake device 7 has a piston 22 and a brake section 23 (clutch section) that has a plurality of first and second brake plates 24, 25. The plurality of first and second brake plates 24, 25 is pressed against one another by the piston 22.

The brake section 23 is disposed between an internal circumferential surface section 31 (first member) that is a portion of the transmission case 21 and a ring gear 13 (second member). The brake section 23 preferably contains the plurality of first brake plates 24 and second brake plates 25. The brake plates 24, 25 are disposed in an alternating manner along the axial direction. Each of the first and second brake plates 24, 25 is an annular plate member. A plurality of engaging teeth 41 engages with teeth 35 of an internal circumferential surface section 31. The engaging teeth 41 are formed on an external circumferential section of the first brake plates 24. A plurality of engaging teeth that engage with external teeth 13a of the ring gear 13 are formed on an internal circumferential section of the second brake plates 25. Additionally, friction material is attached to both faces of the second brake plates 25. Here, "engaging teeth" refers to a plurality of protrusions that project radially inward or outward from the internal or external circumferential edge of an annular plate.

With this arrangement, the first brake plates 24 can move freely in the axial direction but cannot rotate with respect to the transmission case 21. Further, the second plates 25 can move freely in the axial direction but cannot rotate with respect to the ring gear 13. A brake plate among the plurality of first brake plates 24 that is farthest from the piston 22 (rightmost brake plate in FIG. 2) functions as an endplate and bears the load applied by the piston 22. Hereinafter this plate is called an endplate 30. The endplate 30 is thicker than the other first brake plates 24. To the outside of the endplate 30 (i.e. the axial side opposite the piston 22 side), a snap ring 27 for restricting movement in the axial direction is provided on the internal circumferential surface section 31.

Figure 3:
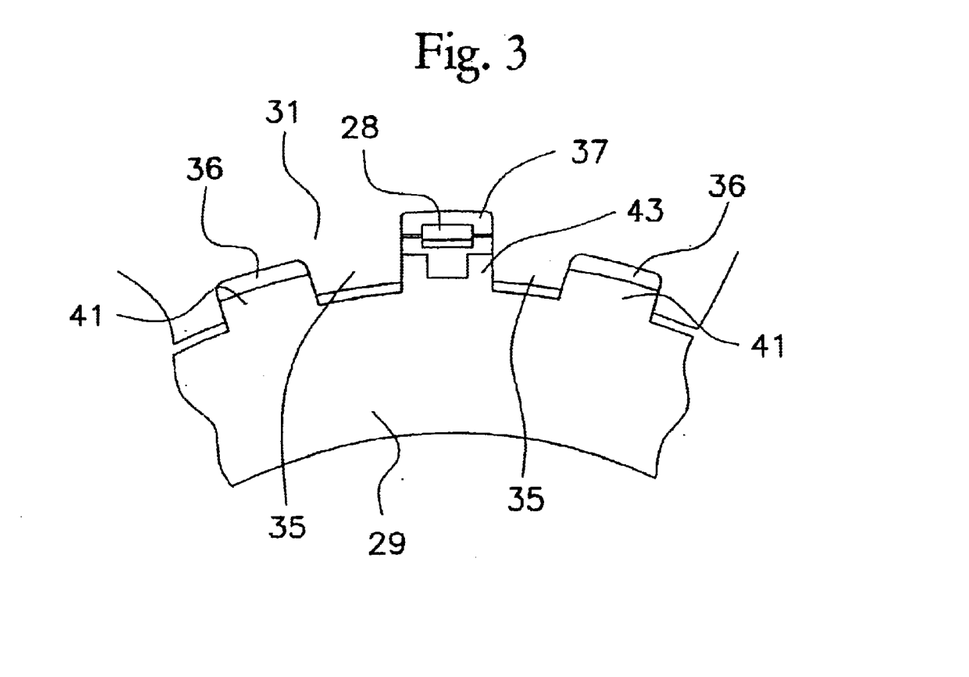
FIG. 3 is a partial elevational view in the direction of arrow III in FIG. 2.

As seen in FIG. 3, the teeth 35 of the internal circumferential surface section 31 are lined up in a circumferential direction and each have a prescribed length in the axial direction. Grooves 36 are disposed circumferentially between the teeth 35. The engaging teeth 41 of the first brake plates 24 fit into the grooves 36 such that the circumferentially facing sides of the teeth 41 and the grooves 36 touch each other. Further a slight gap is secured between the radially facing end faces of the engaging teeth 41 and the bottoms of the grooves 36.

Among the grooves 36 are a plurality of deep grooves 37 that are deeper than the other grooves. The number of deep grooves 37 is preferably between four to ten, inclusive. As seen in FIG. 2, among the engaging teeth 41 of the endplate 30 are engaging teeth 42 that are longer than the other engaging teeth 41 in the radial direction and engage with the deep grooves 37. Meanwhile, among the engaging teeth 41 of the first plate 29 closest to the piston 22 are engaging teeth 43 that are longer than the other engaging teeth 41 in the radial direction and engage with the deep grooves 37. In short, large gaps are formed radially between the engaging teeth 41 of the three middle plates 24 and the deep grooves 37. The engaging teeth 42, 43 of the outside plates 29, 30 face each other through said large gaps inside the deep grooves 37.

As seen in FIGS. 2 and 3, return springs 28 have spring members disposed inside each deep groove 37. The return springs 28 apply a force against the piston 22 in a direction of separation from the brake section 23 when the clutch is engaged. The return springs 28 move the piston 22 when hydraulic pressure on the piston 22 is released. The return springs 28 are disposed axially between the endplate 30 and the first plate 29 closest to the piston 22 such that they can flex in the axial direction between the two plates 29, 30. More specifically, the return springs 28 are disposed inside the deep grooves 37 such that they lie between the deep grooves 37 and the engaging teeth of the three middle first plates 24 in the radial direction and between the engaging teeth 42 of the endplate 30 and the engaging teeth 43 of the first plate 29 in the axial direction.

Figure 4:
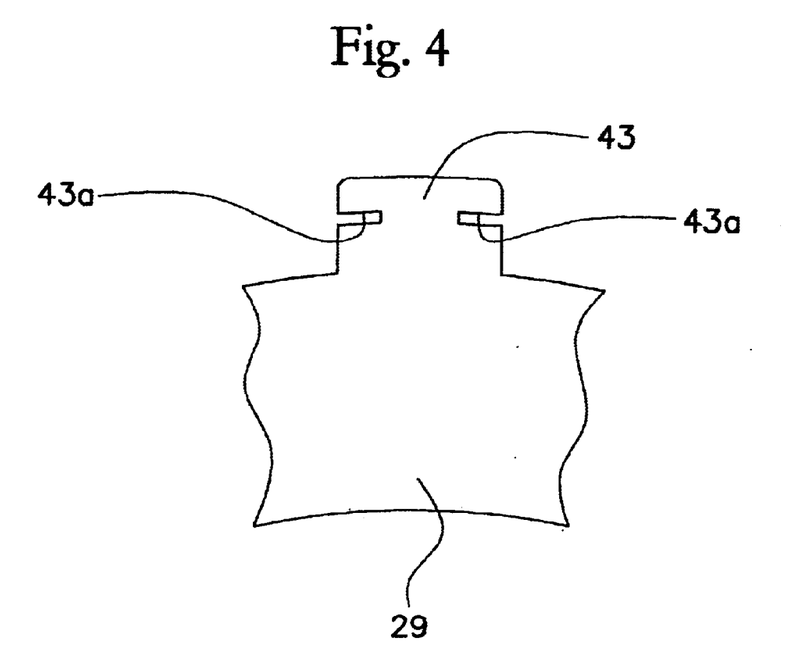
FIG. 4 is an elevational view of an engaging tooth portion of a first plate that is closest to a piston.
Figure 5:
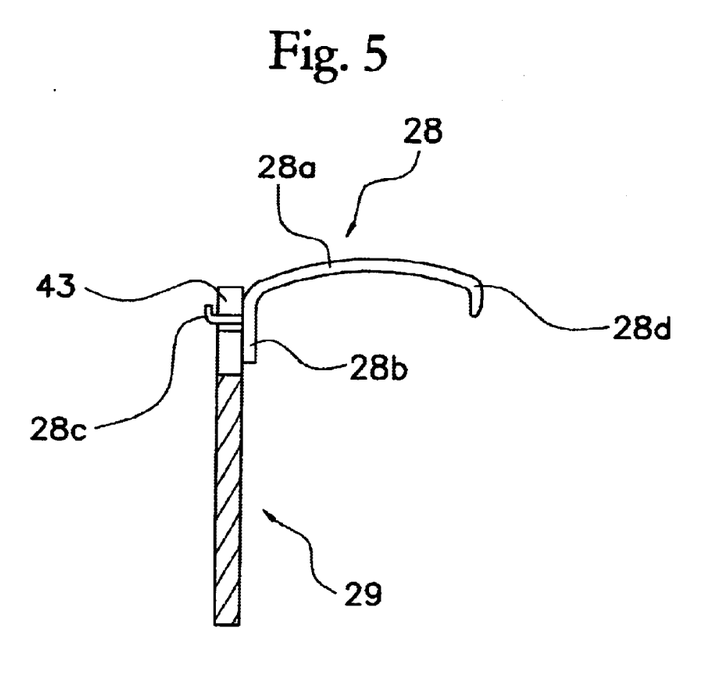
FIG. 5 is a cross-sectional view of a subassembly having the first plate that is closest to the piston and at least one return spring.
Figure 6:
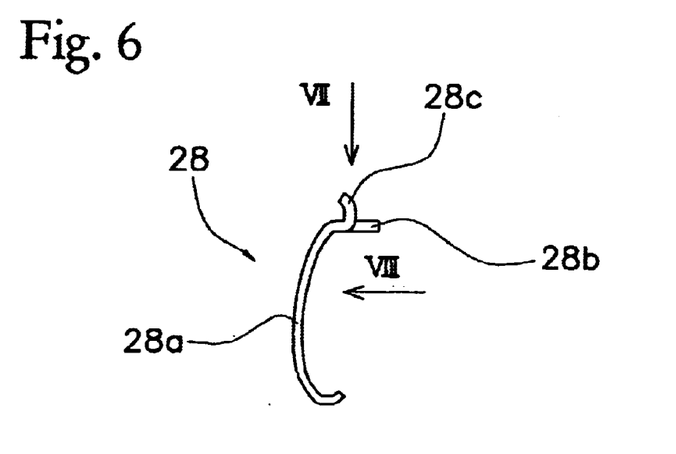
FIG. 6 is an elevational view of the return spring.
Figure 7:
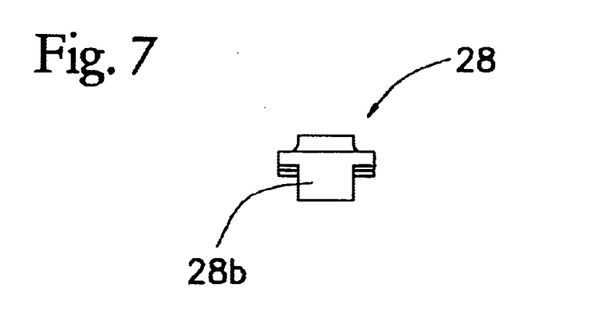
FIG. 7 is an elevational view of the return spring in the direction of arrow VII in FIG. 6.
Figure 8:
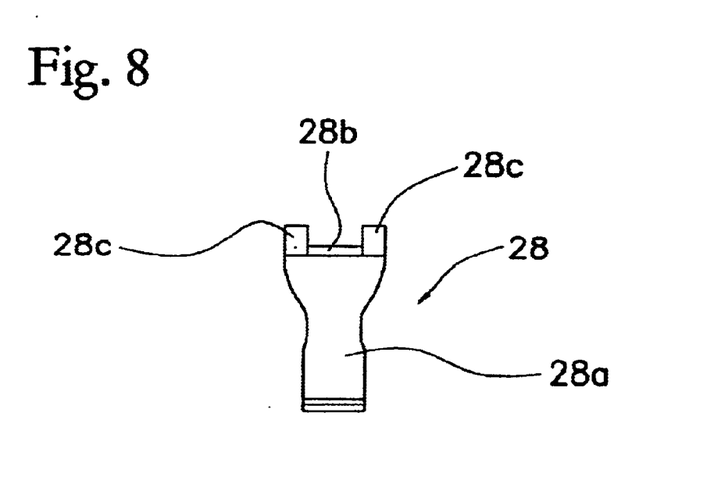
FIG. 8 is a plan view of the return spring in the direction of arrow VIII in FIG. 6.

Referring to FIGS. 5, 6, and 8, the return springs 28 are flat springs. The return springs 28 are relatively slender and long in the axial direction. The main surfaces of the springs face inward and outward, respectively, in the radial direction. Each return spring 28 has a main body 28a. The width of the main body 28a in the circumferential direction is larger at the portion closest to the first plate 29 than at the portion closest to the endplate 30 and both circumferentially facing edges of the former portion touch against the circumferentially facing sides of the deep grooves 37. The entirety of the main body 28a is curved smoothly so as to be convex in the outward radial direction. The vertical cross sectional shape of the main body 28a is oval or semicircular, but a U or V shape is also acceptable. An end of the main body 28a at the first plate 29 that is closest to the piston 22 has a flat section 28b and an engaging claw 28c. The flat section 28b extends radially inward from the main body 28a and touches the axially facing surface of one of the engaging teeth 43 of the first plate 29. The flat section 28b stabilizes the orientation of the first plate 29. The engaging claw 28c is a section formed on both sides of the flat section 28b in a circumferential direction of the first plate 29. The engaging claw 28c extends in the axial direction so as to be inserted into a slit 43a of one of the engaging teeth 43 shown in FIG. 4. Therefore, the return spring 28 is unable to move with respect to the first plate 29 closest to the piston 22 in the rotational and radial directions. Referring to FIG. 5, the tip of the engaging claw 28c is also bent such that it touches against the opposite axially facing surface of one of the engaging teeth 43. As a result, the return spring 28 is unable to move with respect to the first plate 29 closest to the piston 22 in the axial direction. Thus, the plurality of return springs 28 is fixed around the circumference of the first plate 29 closest to the piston 22 and collectively therewith constitutes a single subassembly. This arrangement makes it easier to handle the plurality of return springs 28 and simplifies the operation of installing the plurality of return springs 28 into the deep grooves 37.

As seen in FIG. 2 and 5, the end of each return spring 28 at the endplate 30 has a bent section 28d. The bent section 28d is bent to point in an inward radial direction and touches the axially facing surface of the endplate 30.

The use of flat springs as the return springs makes it possible to conserve space. The flat spring mentioned here is preferably made from a thin sheet material and provides a spring effect. More specifically, the flat spring is preferably made of a thin sheet having a thickness of up to approximately 1 mm that is press worked into the desired shape and thus given a spring effect. The spring load of a flat spring is determined by its thickness, width, and curvature.

The piston 22 is provided between the brake section 23 and a lateral wall section 32 of the transmission case 21. The piston 22 is a roughly ring-shaped member. The piston 22 has on an external circumference a seal ring that is in sliding contact with the internal surface 33 of the external circumferential wall of the transmission case 21. The piston 22 also has on its internal circumference a seal ring that is in sliding contact with the external surface 34 of the internal circumferential wall of the transmission case 21. The piston 22 is made of sheet metal and its external portion is a cylindrical section that runs in the axial direction. The tip surface of the cylindrical section can touch against the outer portion of the first plate 29 that is closest to the piston 22. Thus, a cylinder chamber 45 is formed between the piston 22 and the lateral wall section 32 of the transmission case 21.

Operation

First the operation of the entire forward-reverse rotation device 1 is explained.

When in Neutral

As seen in FIG. 1, when in a neutral state, neither the forward hydraulic clutch device 6 nor the reverse hydraulic brake device 7 is engaged. Consequently, power inputted to the forward clutch device 6 is not transmitted to the planetary gearset 5. Further, the rotation of the planet carrier 15 is not braked. In this state, power from the torque converter is not transmitted to the belt-type continuously variable transmission.

When in Forward

When in forward, hydraulic oil is supplied to the forward hydraulic clutch device 6 and engages it. In short, the planet carrier 15 is made to rotate integrally with the input shaft 2. Meanwhile, hydraulic oil is not supplied to the reverse hydraulic brake device 7 and, consequently, the ring gear 13 of the planetary gearset 5 can rotate freely.

Here, power from the torque converter is transmitted to the output shaft 3 through clutch device 6 and the planet carrier 15 and outputted to the belt-type continuous variable transmission. The belt-type continuously variable transmission rotates in the same direction as the torque converter. Furthermore, in this state, all of the gears 12, 13, 14 of the planetary gearset 5 rotate synchronously as a single unit and torque from the torque converter is neither multiplied nor reduced but transmitted directly to the output shaft 3.

When in Reverse

When in reverse, the forward hydraulic clutch device 6 is disengaged and the reverse hydraulic brake device 7 is operated (braking on). As a result, the rotation of the ring gear 13 of the planetary gearset 5 is prohibited.

In this state, power from the torque converter is transmitted from the sun gear 12 to double the planet gears 14 and the planet carrier 15 and then to the output shaft 3 of the belt-type continuously variable transmission. Since the ring gear 13 is prohibited from rotating by the hydraulic brake device 7, the planet carrier 15 rotates in direction opposing the sun gear 12. Thus, the output shaft 3 rotates in a direction opposite its forward operation rotation.

Operation of Brake Device

Next, the operation of the brake device 7 is explained in detail.

Referring to FIG. 2, the piston 22 moves in the axial direction due to the delivery of hydraulic oil into the cylinder chamber 45 and pushes the first and second brake plates 24, 25 against one another. When this occurs, the piston 22 pushes the first plate 29 that is closest to the piston 22 with a force that is greater than the spring load of the return spring 28. The return spring 28 is compressed in the axial direction and, more specifically, curves so as to be convex in an outward radial direction. Also, the return spring 28 bends smoothly due to the bent section 28d (FIG. 5). The configuration of the return spring 28 makes it difficult for buckling or other problems to occur. Referring to FIG. 2, in this state, the return spring 28 applies a return load against the first plate 29 and the piston 22 in the direction of separation from the brake section 23. The piston 22 moves until the first and second brake plates 24, 25 touch against one another. The amount of this movement varies depending on the number of first and second brake plates 24, 15, but it is roughly 1 mm.

When the supply of hydraulic pressure to the cylinder chamber 45 ceases, the load applied against the piston 22 disappears. The first plate 29 that is closest to the cylinder is pushed by return spring 28 and separates from the brake section 23, thus pushing against the piston 22. As a result, the plates 24, 25 separate from each other and the clutch or brake device 7 disengages.

Effects

As discussed previously, since the return springs 28 are disposed inside the deep grooves 37 of the internal circumferential surface section 31, the conventional retaining plate, snap ring, and groove for the snap ring are eliminated. Also, the extra space occupied by conventional return springs is not necessary.

Improved compactness makes it easier to design the transmission. Since the extra space normally occupied by the returns springs is eliminated, the entire transmission, including the housing, is more compact and thus lighter in weight.

Since the snap ring and retaining plate parts are unnecessary, the device is less expensive. Cost is also lowered by the reduction in weight.

Alternate Embodiments

Referring now to FIGS. 9 to 17, a multiple plate clutch device in accordance with alternate embodiments of the present invention will now be discussed. In view of the similarities between the previous embodiment and the alternate embodiments, the components or parts of the alternate embodiments that have the same function of the corresponding components or parts of the previous embodiment are being given identical reference numerals. Moreover, the explanations of components or parts and operations of the alternate embodiments that are similar to components or parts and operations of the first embodiment will be omitted. Only components and operations of the alternate embodiments that are different in structure and function from the previous embodiment will be explained herein. In other words, the basic structure of the alternate embodiments is the same as that of the first embodiment. Only the differences are described here.

Second Embodiment

Figure 10:
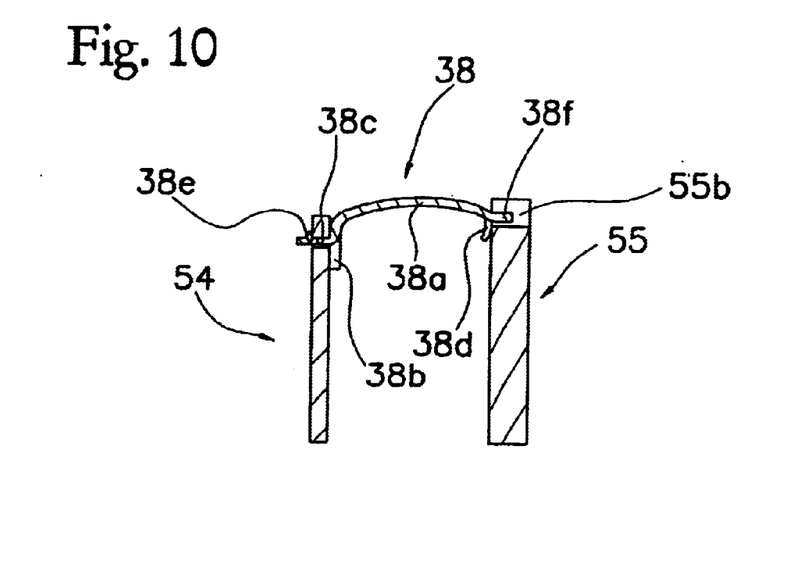
FIG. 10 is a cross-sectional view of a subassembly and the endplate in accordance with the second embodiment of the present invention.

Referring to FIG. 10 the middle portion of a main body 38a of each return spring 38 is of a rectangular shape that extends in an axial direction and both ends thereof spread in both circumferential directions. Both circumferentially facing edges of both ends of the return spring 38 touch against both circumferentially facing sides of the deep groove 37.

Figure 9:
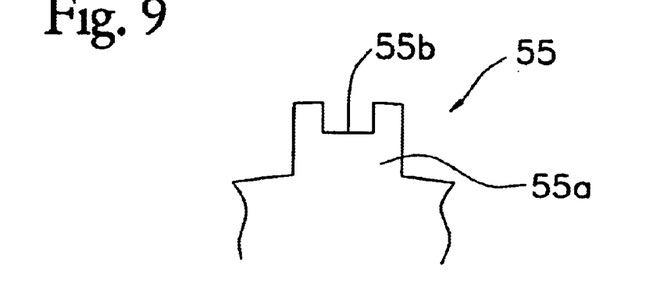
FIG. 9 is an elevational view of an engaging tooth portion of an endplate in accordance with a second embodiment of the present invention.

The end of the return spring 38 that is closer to an endplate 55 is held by the endplate 55. Thus, its movement in the radial direction, particularly the inward radial direction, is restricted. More specifically, at one end of the return spring 38, a projection 38f extends in the axial direction. The end is formed on a portion of a bent section 38d that is in the middle with respect to the circumferential direction of the device. Meanwhile, as shown in FIG. 9, a notch 55b is provided in the radially outward-facing end of an engaging tooth 55a of the endplate 55. The notch 55b opens in an outward radial direction. The projection 38f of the return spring 38 is held in the notch 55b and its movement in the inward radial direction is restricted. As a result, the position of the end of the return spring 38 that is closer to the endplate is determined and the return spring 38 is prevented from moving in the inward radial direction or popping out of position.

Figure 11:
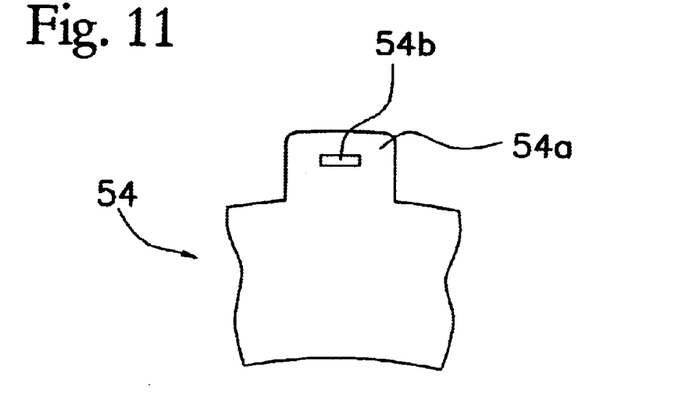
FIG. 11 is an elevational view of an engaging tooth section of a first plate that is closest to a piston in accordance with the second embodiment of the present invention.
Figure 12:
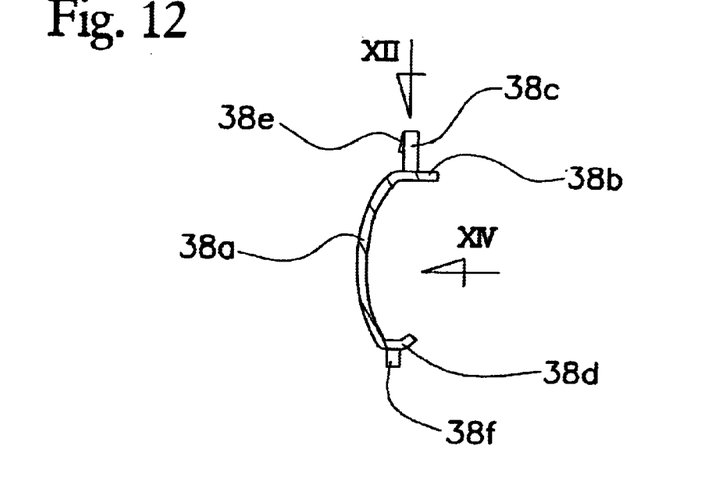
FIG. 12 is a cross-sectional view of a return spring in accordance the second embodiment of the present invention.
Figure 13:
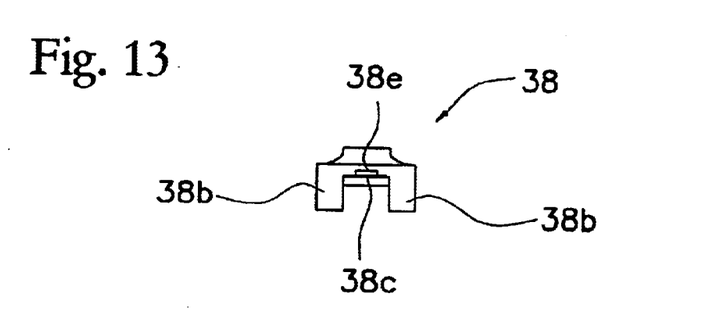
FIG. 13 is an elevational view of the return spring in the direction of arrow XIII in FIG. 12.

As seen in FIG. 10, the end of the return spring 38 at a first plate 54 that is closest to the piston 22 has a flat section 38b and a projection 38c. The projection 38c extends in the axial direction and is formed on a middle portion of the flat section 38b. Meanwhile, as shown in FIG. 11, a slit 54b is formed on an engagement tooth 54a of the first plate 54 that is closest to the piston 22. The projection 38c extends through and beyond the slit 54b in the axial direction. As seen in FIG. 10, a spring back section 38e is also formed on the projection 38c by cutting and bending upward a portion of the projection 38c. The spring back section 38e touches against a piston facing face of the engaging tooth 54a and prevents the projection 38c from coming out. Thus, the return spring 38 is secured to the first plate 54 that is closest to the piston 22 and forms a subassembly. As a result, the handling and assembly of both members is easier. More particularly, a plurality of return springs 38 is secured to the first plate 54 that is closest to the piston 22 in advance. During assembly, it is sufficient to attach simply the first plate 54 to the transmission case 21. It is not necessary to arrange each return spring 38 inside the grooves 37 one by one.

When a return spring 38 is secured to the first plate 54, the spring back section 38e is formed inside the slit 54b as the projection 38c is passed into the slit 54b. At the position where the flat section 38b contacts the axially facing surface of the engaging tooth 54a, the spring back section pops out of the slit 54b and touches against the opposite axially facing surface of the engaging tooth 54a.

Third Embodiment

Figure 15:
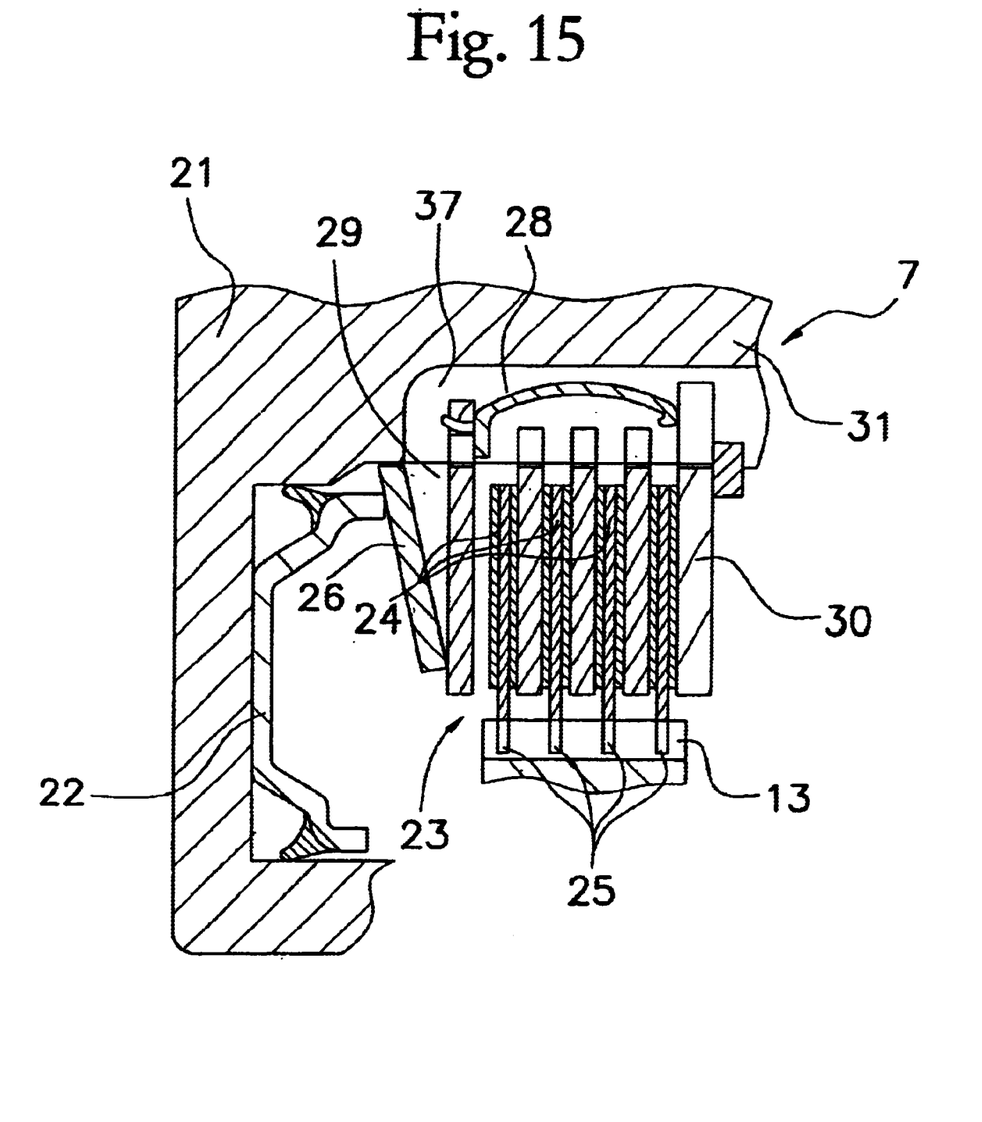
FIG. 15 is a cross-sectional schematic view of a brake device in accordance with a third embodiment of the present invention.

This embodiment has the same basic structure as the first embodiment. Referring to FIG. 15, a dish plate or Belleville spring 26 is disposed between the piston 22 and the first plate 29 is closest to the piston 22. The Belleville spring 26 serves as a damping spring for absorbing the shock that occurs when the piston 22 engages the brake section 23. The Belleville spring 26 is an annular disk member and preferably is conical in shape. The internal circumferential edge of the Belleville spring 26 is supported on the first plate 29 and the external circumferential edge is supported on a pushing section of the piston 22.

FIG. 15 shows the disengaged condition of the clutch or reverse hydraulic brake device 7. The piston 22 is pushed away from the endplate 30 by the return spring 28 through the first plate 29 and the Belleville spring 26. In this condition, the Belleville spring 26 is flexed in accordance with the spring load of the return spring 28.

The piston 22 moves in an axial direction and pushes the first and second brake plates 24, 25 against one another when hydraulic oil is supplied to the cylinder chamber 45. Here, the piston 22 pushes the first brake plate 29 adjacent the Belleville spring 26 through the Belleville spring 26 with a force larger than the spring load of the return spring 28.

The piston 22 moves until the first and second brake plates 24, 25 touch one another. After the plates 24, 25 contact one another, the piston 22 moves toward the endplate 30 until the Belleville spring 26 is flattened. In this condition, the load applied on the brake section 23 is equal to the difference between the spring load of the Belleville spring 26 and the spring load of the return spring 28. The movement stroke of the piston 22 in this embodiment is larger than that in the first embodiment by the distance through which the Belleville spring 26 flexes, but the movement stroke of the return spring 28 is the same as in the first embodiment. Therefore, similar to the first embodiment, the movement stroke of the return spring 28 can be held to a very small amount because the return spring 28 does not act on the piston 22 directly. Rather, the return spring 28 acts on the first plate 29, which is closest to the piston among the brake plates and disposed on the the brake section 23 side of Belleville spring 26. In a conventional arrangement the return spring has a large stroke, making it difficult to provide a return spring with sufficient performance.

Since the spring load of the Belleville spring 26 is generally set to be larger than the spring load of the return spring 28, there is no large effect on the shock absorbing performance of the Belleville spring 26 when the return spring 28 pushes the Belleville spring 26.

Fourth Embodiment

Figure 16:
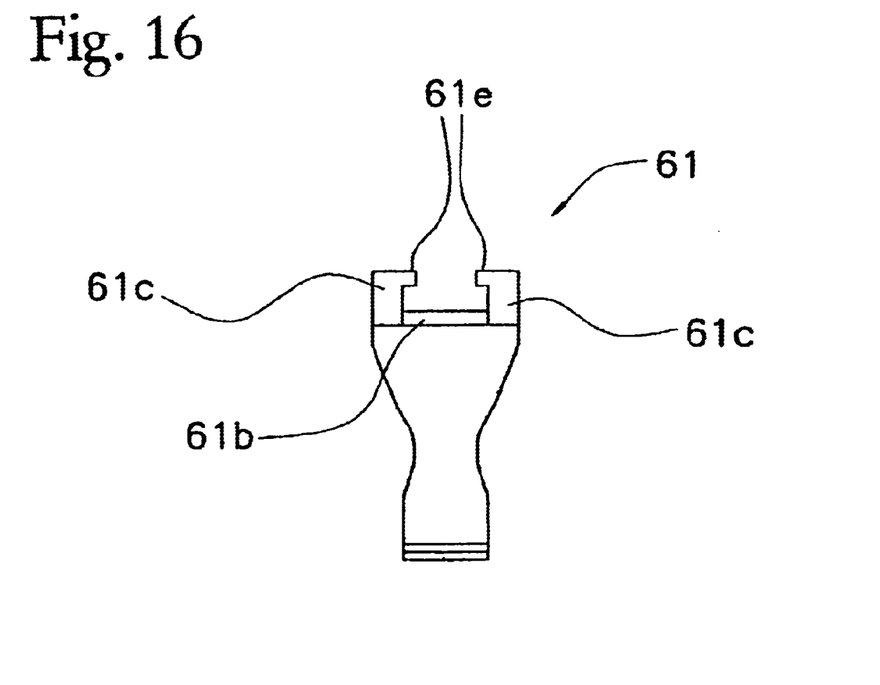
FIG. 16 is a plan view of a return spring in accordance with a fourth embodiment of the present invention.

A return spring 61 shown in FIG. 16 has basically the same structure as the return spring 28 shown in FIG. 8 of the first embodiment except that return prevention turned-back parts 61e are provided on the tips of two claws 61c. The turned-back parts 61e extend inward toward each other in the circumferential direction.

The claws 61c spread apart in a circumferential direction when they are inserted into a slit 43a but return toward each other simultaneously when a flat section 61b touches against an engaging tooth. When the claws 61c return, turned-back parts 61e touch against the opposite axially facing surface of the engaging tooth.

Fifth Embodiment

Figure 14:
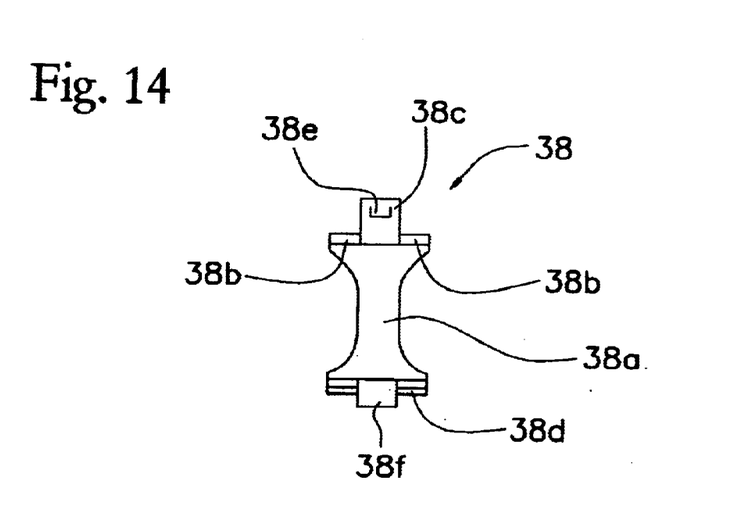
FIG. 14 is a plan view of the return spring in the direction of arrow XIV in FIG. 12.
Figure 17:
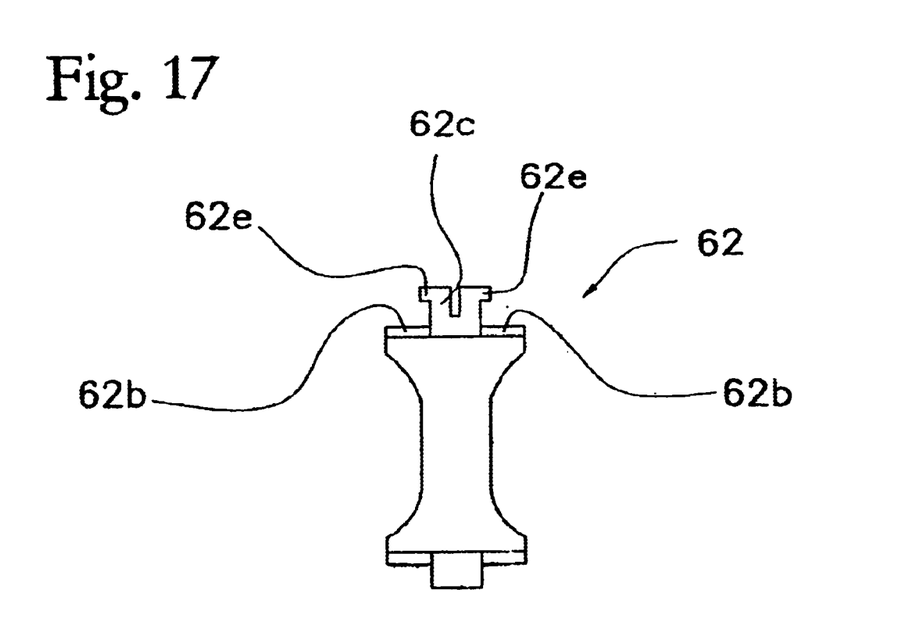
FIG. 17 is a plan view of a return spring in accordance with a fifth embodiment of the present invention.

A return spring 62 shown in FIG. 17 has basically the same structure as the return spring 38 shown in FIG. 14 of the second embodiment except that a projection or claw 62c is divided into two sections in the radial direction and a return prevention turned-back part 62e is provided on the tip of each of the two sections. The turned-back parts 62e extend outward and away from each other in the circumferential direction.

The two sections of the claw 62c contract inward in the circumferential direction when they are inserted into the slit 54b but return simultaneously outward in the circumferential direction when a flat section 62b touches against an engaging tooth. When the claw sections return, the turned-back parts 62e touch against the opposite axially facing surface of the engaging tooth.

Since the present invention can be applied to all types of multiple plate clutches, it is not limited to the embodiments described heretofore. Furthermore, when the invention is used in a brake device, it is not necessary to use a special structure to prevent problems resulting from centrifugal force because centrifugal force does not act on the return spring. Particularly in the case of a brake device, the spring load of the return spring is preferably 50 kg and the degree of precision does not need to be particularly high.

In a multiple plate clutch device in accordance with the present invention, the extra space occupied by a conventional return spring in the prior art can be eliminated because the return spring is disposed inside a groove between the teeth of a first member.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A multiple plate clutch device comprising:

a first member having a plurality of teeth aligned around a circumference thereof;

a second member being disposed to face said first member in the radial direction;

a plurality of first plates having engaging teeth that engage with the plurality of teeth of said first member, said plurality of first plates being non-rotatable and axially movable relative to said first member, said plurality of first plates having an end plate, said end plate being configured to contact in an axial direction a snap ring;

a plurality of second plates being disposed alternately with respect to said plurality of first plates in an axial direction and non-rotatably and axially movably engaging with said second member relative to said second member;

a piston being configured to press said plurality of first plates and said plurality second plates together; and a return spring being disposed inside a groove between said teeth of said first member, said return spring being configured to contact said end plate and to push one of said plurality of first plates being closest to said piston toward said piston.

2. A multiple plate clutch device comprising:

a first member having a plurality of teeth aligned around a circumference thereof;

a second member being disposed to face said first member in the radial direction;

a plurality of first plates having engaging teeth that engage with the plurality of teeth of said first member, said plurality of first plates being non-rotatable and axially movable relative to said first member;

a plurality of second plates being disposed alternately with respect to said plurality of first plates in an axial direction and non-rotatably and axially movably engaging with said second member relative to said second member;

a piston being configured to press said plurality of first plates and said plurality second plates together; and a return spring being disposed inside a groove between said teeth of said first member, said return spring being configured to push one of said plurality of first plates being closest to said piston toward said piston, said return spring is being a flat spring.

3. The multiple plate clutch device according to claim 2, wherein said return spring is disposed between an engaging tooth of said one of said plurality of first plates being closest to said piston and an engaging tooth of one of said plurality of first plates being farthest from said piston.

4. The multiple plate clutch device according to claim 2, wherein said return spring comprises an engaging claw that extends in an axial direction, said engaging claw is configured to be inserted into a slit of said engaging tooth.

5. The multiple plate clutch device according to claim 4, wherein said return spring comprises two engaging claws.

6. The multiple plate clutch device according to claim 5, wherein said claws extend toward each other.

7. The multiple plate clutch device according to claim 5, wherein said claws extend opposite each other.

8. The multiple plate clutch device according to claim 4, wherein said return spring comprises a projection arranged on an end opposite said engaging claw, said projection is held in a notch of another of said plurality of first plates.

9. The multiple plate clutch device according to claim 8, wherein said return spring comprises a spring back section formed on said engaging claw, said spring back section extends in a radial direction and is configured to contact a piston facing face of said engaging tooth.

10. The multiple plate clutch device according to claim 4, further comprising a Belleville spring arranged between said piston and said one of said plurality of first plates being closest to said piston.

11. The multiple plate clutch device according to claim 10, wherein a spring load of said Belleville spring is greater than a spring load of said return spring.

12. The multiple plate clutch device according to claim 2, further comprising a Belleville spring arranged between said piston and said one of said plurality of first plates being closest to said piston.

13. The multiple plate clutch device according to claim 12, wherein a spring load of said Belleville spring is greater than a spring load of said return spring.

14. A multiple plate clutch device comprising:
a first member having a plurality of teeth aligned around a circumference thereof;
a second member being disposed to face said first member in the radial direction;
a plurality of first plates having engaging teeth that engage with the plurality of teeth of said first member, said plurality of first plates being non-rotatable and axially movable relative to said first member;
a plurality of second plates being disposed alternately with respect to said plurality of first plates in an axial direction and non-rotatably and axially movably engaging with said second member relative to said second member;
a piston being configured to press said plurality of first plates and said plurality second plates together; and
a return spring being disposed inside a groove between said teeth of said first member, said return spring being configured to push one of said plurality of first plates being closest to said piston toward said piston, an end of said return spring being held in said engaging tooth of said one of said plurality of first plates being closest to said piston.

15. A multiple plate clutch device according to claim 14, wherein said end of said return spring is fixedly connected to said engaging tooth of said one of said plurality of first plates being closest to said piston in such a manner that said return spring cannot fall out.

16. The multiple plate clutch device according to claim 15, wherein a slit is provided in said engaging tooth of said one of said plurality of first plates being closest to said piston and said return spring has a claw that is connected to said slit provided in said engaging tooth of said one of said plurality of first plates being closest to said piston.

17. The multiple plate clutch device according to claim 16, wherein said return spring has a flat section that abuts an axially facing surface of said engaging tooth of said one of said plurality of first plates being closest to said piston.

18. The multiple plate clutch device according to claim 17, wherein said return spring has a curved part that contacts said engaging tooth of said one said first plate being farthest from said piston.

19. The multiple plate clutch device according to claim 18, wherein said return spring has a projection whose movement in the radial direction is restricted by said engaging tooth of said first plate that is farthest from said piston.

20. The multiple plate clutch device according to claim 14, wherein said return spring is a flat spring.

* * * * *